(12) United States Patent
Ballam et al.

(10) Patent No.: US 11,167,715 B2
(45) Date of Patent: Nov. 9, 2021

(54) VEHICLE PILLAR RELEASE ASSEMBLIES AND RELATED METHODS

(71) Applicant: Autoliv ASP, Inc., Ogden, UT (US)

(72) Inventors: David Oral Ballam, Wellsville, UT (US); Brian Laird, Roy, UT (US); Yutaka Hirata, Layton, UT (US); Lindford R. T. Smith, Washington, UT (US)

(73) Assignee: Autoliv ASP, Inc., Ogden, UT (US)

( * ) Notice: Subject to any disclaimer, the term of this patent is extended or adjusted under 35 U.S.C. 154(b) by 15 days.

(21) Appl. No.: 16/742,690

(22) Filed: Jan. 14, 2020

(65) Prior Publication Data
US 2021/0213905 A1 Jul. 15, 2021

(51) Int. Cl.
*B60R 21/215* (2011.01)
*B60R 21/213* (2011.01)
*B60R 21/232* (2011.01)

(52) U.S. Cl.
CPC .......... *B60R 21/215* (2013.01); *B60R 21/213* (2013.01); *B60R 21/232* (2013.01); *B60R 2021/21518* (2013.01)

(58) Field of Classification Search
CPC .......... B60R 2021/21506; B60R 2021/21512; B60R 2021/21518; B60R 21/213; B60R 21/215; B60R 21/232
See application file for complete search history.

(56) References Cited

U.S. PATENT DOCUMENTS

| | | | |
|---|---|---|---|
| 6,431,584 B1* | 8/2002 | Nagasawa | B60R 13/0206 280/728.2 |
| 6,431,585 B1* | 8/2002 | Rickabus | B60R 21/215 24/114.05 |
| 6,722,691 B1* | 4/2004 | Håland | B60R 21/233 280/730.1 |
| 6,913,280 B2* | 7/2005 | Dominissini | B60R 21/213 280/728.2 |
| 7,520,527 B2* | 4/2009 | Yamagiwa | B60R 21/213 280/728.2 |
| 7,581,749 B2* | 9/2009 | Robins | B60R 21/02 280/728.2 |
| 7,703,798 B2* | 4/2010 | Yamagiwa | B60R 21/213 280/728.2 |

(Continued)

FOREIGN PATENT DOCUMENTS

JP        11321524 A   * 11/1999   ......... B60R 21/2171
JP     2015102152 A   *  6/2015

*Primary Examiner* — Laura Freedman
(74) *Attorney, Agent, or Firm* — Matthew D. Thayne; Thayne and Davis LLC

(57) ABSTRACT

Pillar release mechanisms and related airbag cushion assemblies. Some embodiments may comprise a curtain airbag assembly comprising an inflator and a curtain airbag cushion configured to be inflated with the inflator. The curtain airbag cushion may extend along an elongated axis and the curtain airbag assembly may be configured to be positioned within and deploy from a panel of a vehicle. The assembly may further comprise a release mechanism coupled with the curtain airbag cushion and configured to be coupled with the panel. The release mechanism may be configured to release the panel using an initial deployment force from the curtain airbag cushion, the initial deployment force being in a direction at least substantially parallel to the elongated axis.

19 Claims, 10 Drawing Sheets

(56) References Cited

U.S. PATENT DOCUMENTS

| | | | | |
|---|---|---|---|---|
| 7,922,189 | B1* | 4/2011 | Dillon | B60R 21/213 |
| | | | | 280/728.1 |
| 8,316,514 | B2* | 11/2012 | Sano | B60R 13/0206 |
| | | | | 24/297 |
| 8,360,463 | B2* | 1/2013 | Isayama | B60R 21/215 |
| | | | | 280/728.3 |
| 8,403,356 | B2* | 3/2013 | Tago | B60R 21/026 |
| | | | | 280/728.2 |
| 9,487,162 | B2* | 11/2016 | Inagawa | B60R 13/0206 |
| 9,751,489 | B2* | 9/2017 | Yamamoto | B60R 21/213 |
| 10,434,971 | B2* | 10/2019 | Arima | B60R 21/261 |
| 10,800,371 | B2* | 10/2020 | Marini | F16B 2/08 |
| 10,875,485 | B2* | 12/2020 | Beltran | F16B 5/0657 |
| 2019/0322237 | A1* | 10/2019 | Bacelos | B60R 13/025 |
| 2020/0406851 | A1* | 12/2020 | Gammill | B60R 21/08 |

* cited by examiner

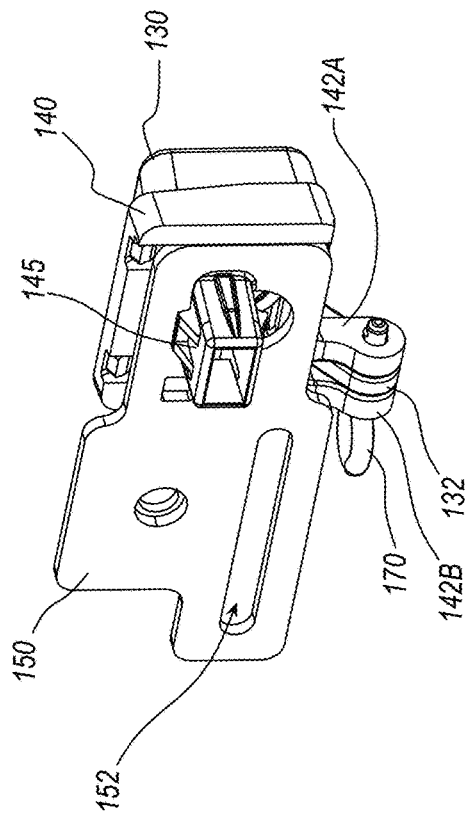
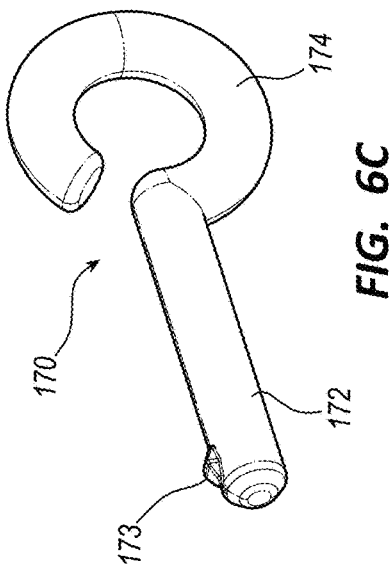
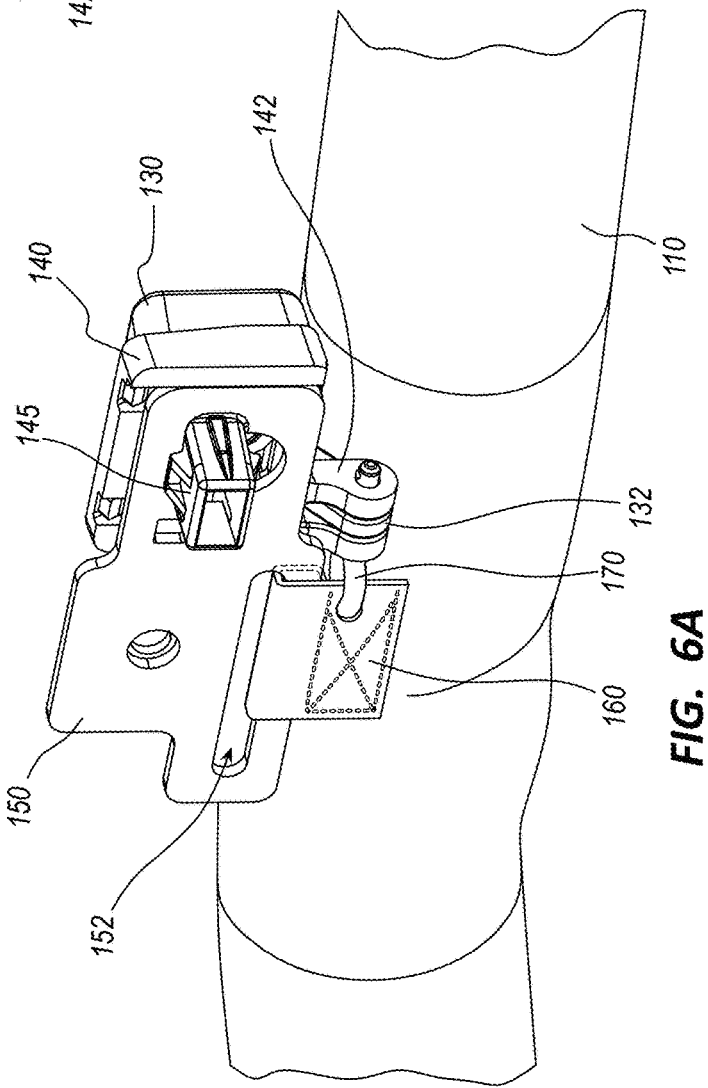
FIG. 6B
FIG. 6C
FIG. 6A

VEHICLE PILLAR RELEASE ASSEMBLIES AND RELATED METHODS

SUMMARY

Airbag cushions are often deployed from behind openable structures, such as in the case of side curtain airbag cushions, from a pillar trim element and/or headliner of the vehicle, such as the A-pillar trim garnish. However, deployment of such cushions typically requires a force in the inboard direction, which occurs at a relatively late stage of deployment and is relatively weak compared to the predominant force and deployment direction, which is in the downward direction. This weak force, relatively late force application, and/or less than ideal direction of force application result in a few potential failure modes, such as cracks or breaks in the panel, which can allow pieces of the panel to become projectiles within the vehicle. Similarly, in some cases, the panel may fail to fully detach, which may cause partial deployment of the cushion and result in inadequate or at least reduced occupant protection. In still other cases, the panel may detach late, thereby slowing the deployment of the curtain airbag cushion and resulting in similar drawbacks.

The present inventors have therefore determined that it would be desirable to provide apparatus, systems and methods that overcome one or more of the foregoing limitations and/or other limitations of the prior art. In some embodiments, the inventive concepts disclosed herein may therefore provide an improved assembly/mechanism for release of a panel or other openable structure from which a curtain airbag cushion or another airbag cushion may be configured to deploy. In some preferred embodiments, the assembly/mechanism may advantageously use a pre-existing retraction force of many current curtain airbag cushions to provide the force for releasing the panel.

In a more particular example of a curtain airbag cushion assembly according to some embodiments, the assembly may comprise an inflator and a curtain airbag cushion configured to be inflated with the inflator, the curtain airbag cushion extending along an elongated axis. The curtain airbag assembly may be configured to be positioned within and deploy from a panel of a vehicle, such as an A-pillar trim panel or another trim panel. A release mechanism may be coupled with the curtain airbag cushion and coupled with or configured to be coupled with the panel. The release mechanism may be configured to release the panel using an initial deployment force from the curtain airbag cushion, the initial deployment force being in a direction at least substantially parallel to the elongated axis.

In some embodiments, the release mechanism may be configured to release the panel prior to deployment of the curtain airbag cushion in a direction at least substantially perpendicular to the elongated axis. In some such embodiments, the initial deployment force may comprise a retraction force in which the curtain airbag cushion retracts in length between opposing ends of the elongated axis prior to deploying in a direction at least substantially perpendicular to the elongated axis. Similarly, the initial deployment force may act upon the release mechanism prior to any inflation of the curtain airbag cushion immediately adjacent to the release mechanism.

In some embodiments, the release mechanism may comprise a release member, such as a release pin, configured to slidably release the panel using the initial deployment force. The release pin or other release member may be coupled with a first coupling piece and a second coupling piece or body, which may be releasably coupled with one another. In some embodiments, one of the releasable coupling pieces may comprise an outboard coupling piece (positioned adjacent to the outboard side of the assembly) and the other may comprise an inboard coupling piece (positioned adjacent to the inboard side of the assembly). In some embodiments, the release pin may be configured to lock the first coupling piece to the second coupling piece in a locked configuration and being configured to release the first coupling piece from the second coupling piece in a released configuration using the initial deployment force.

Some embodiments may further comprise a tab coupled to the curtain airbag cushion and to the release pin. The tab may be configured to pull the release pin out of an opening formed in the first coupling piece and the second coupling piece to transition from the locked configuration to the released configuration. In some embodiments, the tab may comprise a fabric tab and/or a two layered tab.

In an example of airbag cushion assembly according to other embodiments, the assembly may comprise an elongated airbag cushion, such as curtain airbag cushion, extending along an elongated axis and a release mechanism configured to release a vehicle structure adjacent to the elongated airbag cushion during deployment. The release mechanism may be configured to have a locked configuration and a released configuration, wherein in the locked configuration a first element of the release mechanism is secured to a second element of the release mechanism to secure the elongated airbag cushion within the vehicle structure, and wherein in the released configuration the first element of the release mechanism can be separated from the second element of the release mechanism to allow the vehicle structure to open and allow the elongated airbag cushion to deploy. In some embodiments, the release mechanism may be configured to use a force from deployment of the elongated airbag cushion to transition from the locked configuration to the released configuration.

In some embodiments, the release mechanism may be configured to release the panel using an initial deployment force from the curtain airbag cushion, the initial deployment force being in a direction at least substantially parallel to the elongated axis. In some embodiments, the release mechanism may be configured to release the panel using only the initial deployment force.

In some embodiments, the release mechanism may comprise a release member, such as a pin, configured to release the vehicle structure. In some embodiments, the first element may have a first opening and the second element may have a second opening. The release pin or other release member may then extend through the first and second openings to lock the first element to the second element in a locked configuration and to slidably release the first element from the second element in a released configuration using the force from deployment.

In an example of a release assembly for releasing a vehicle panel to allow for deployment of an airbag cushion, such as a curtain airbag cushion, contained with the vehicle panel, the release assembly may comprise a first coupling piece configured to be coupled to a vehicle panel, such as an A-pillar trim panel or other trim panel, and a second coupling piece configured to be coupled to a vehicle structure opposite the vehicle panel, such as a mounting surface of an A-pillar or other suitable surface of a vehicle. The release assembly may further comprise a release member coupled with the first coupling piece and the second coupling piece. The release member may be configured to lock the first release piece to the second release piece in a locked configuration and configured to release the first coupling piece from the second coupling piece using a deployment force from an airbag cushion coupled with the release assembly.

In some embodiments, the release assembly may be configured to release the vehicle panel using an initial deployment force from the airbag cushion, which initial deployment force may in some such embodiments be in a direction at least substantially perpendicular to a primary direction of deployment of the airbag cushion.

In some embodiments, the airbag cushion may comprise an elongated axis. In some such embodiments, the initial deployment force may be in a direction at least substantially parallel to the elongated axis. In some embodiments, the release assembly may be configured to release the vehicle panel using an initial deployment force from the airbag cushion, which initial deployment force may be in a direction towards a center of the airbag cushion in some embodiments.

In some embodiments, the release member may comprise a release pin configured to be received in an opening in the locked configuration and configured to be removed from the opening in a released configuration. In some such embodiments, the opening may be defined at least in part by a first coupling member of the first coupling piece and at least in part by a second coupling member of the second coupling piece. For example, openings in the respective coupling members may be aligned to allow the release pin to extend through both coupling pieces and/or coupling members.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which:

FIG. 6A depicts the release mechanism coupled with a curtain airbag cushion;

FIG. 6B depicts the primary components of a release mechanism according to some embodiments;

FIG. 6C is a perspective view of a release pin of a release mechanism according to some embodiments;

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
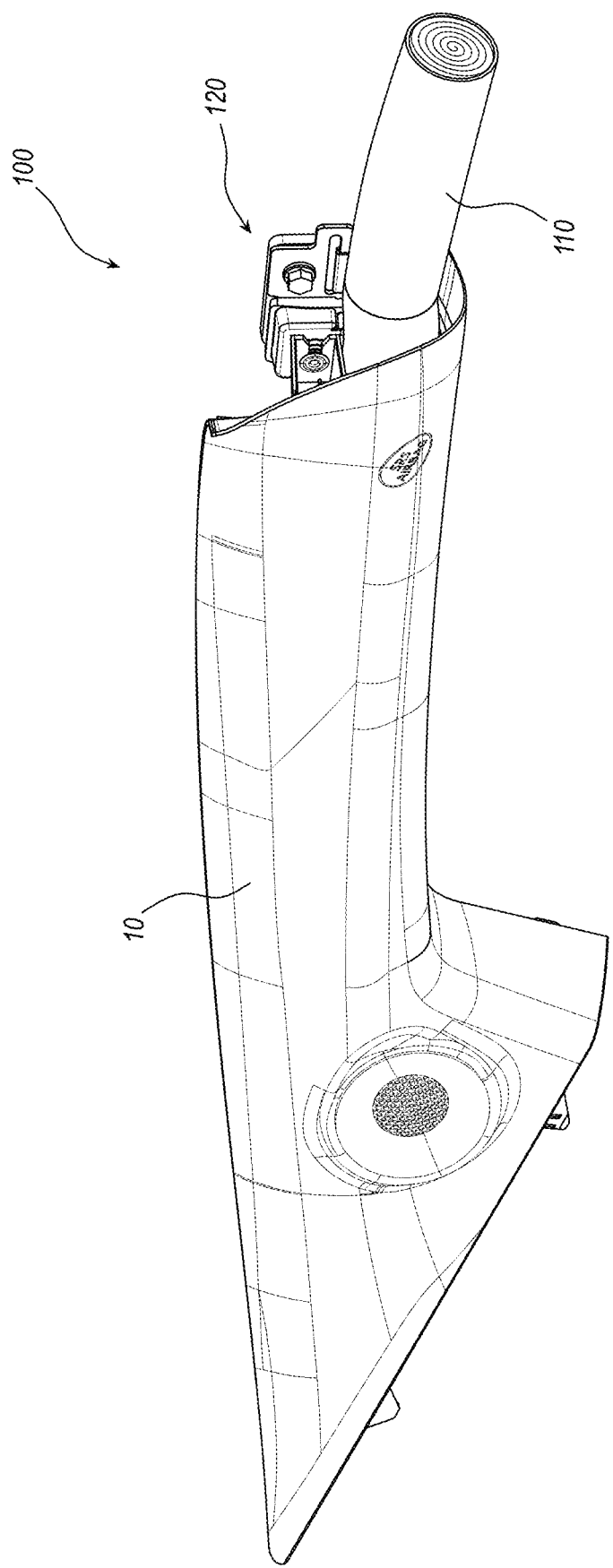
FIG. 1 is a perspective view of a curtain airbag assembly according to some embodiments positioned within a vehicle panel.

FIG. 1 depicts the interior of a vehicle comprising a deployment chamber in within which an airbag module or portion of an airbag assembly or module, such as curtain airbag assembly 100, may be positioned and from which may deploy using inflator 101. One or more regions of the deployment chamber may be openable and may therefore be referred to herein as "openable structures." Examples of possible openable structures may include various trim panels, such as trim panel 10 shown in FIG. 1, which may comprise an A-pillar trim panel in certain preferred embodiments. However, although other trim elements, such as a portion of a vehicle headliner, or other structures, such as an airbag cover, etc., may be used in alternative embodiments.

Figure 2:
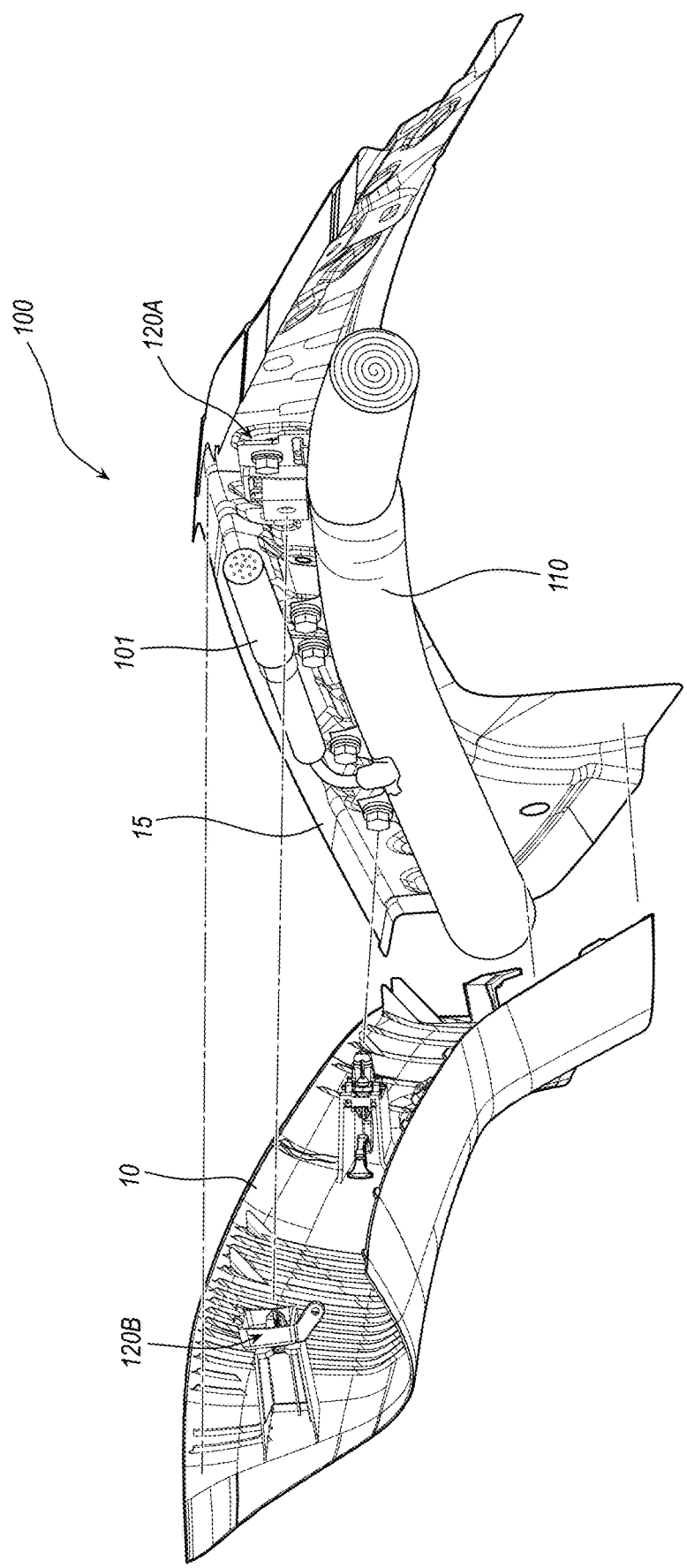
FIG. 2 depicts the curtain airbag assembly of FIG. 1 with the panel exploded away from the adjacent vehicle structure.

Curtain airbag assembly 100 comprises a cushion 110 configured to be inflated with inflator 101 (see FIG. 2). In addition, the curtain airbag cushion 110 extends along an elongated axis and is configured to deploy primarily in a direction perpendicular to the elongated axis, which typically comprises a downward direction along the side of a door in a vehicle. Airbag assembly 100 further comprises a release mechanism 120 coupled with the curtain airbag cushion 110 and coupled with the panel 10. As discussed in connection with other figures, in preferred embodiments, release mechanism is also coupled, or configured to be coupled, with an opposing structure, such as a mounting surface or other portion of a frame or other suitable structure within a vehicle.

For example, as shown in FIG. 2, airbag assembly 100 may be positioned in between a mounting surface 15 of a vehicle and panel 10. As discussed throughout and in greater detail below, release mechanism 120 is configured to release panel 10 to allow cushion 110 to deploy therefrom. More particularly, in preferred embodiments, release mechanism is configured to use a force from deployment of the airbag cushion 110, and even more particularly and more preferably, an initial deployment force from the curtain airbag cushion 110, the initial deployment force being in a direction at least substantially parallel to or along the elongated axis.

In other words, many curtain airbag cushions are configured to deploy in a manner such that, initially, the cushion contracts towards the center of the cushion in a direction along its axis prior to deploying perpendicular to this axis—e.g., typically in a downward direction. Thus, preferred embodiments of the invention are configured to utilize this initial force already present to release a panel, such as panel 10, or another openable structure to allow the cushion to deploy while eliminating or at least reducing common problems with other release mechanisms, such as breaking the panel, incomplete releasing of the panel, late releasing of the panel, and the like, which may result in reduced occupant protection. It should be understood, however, that the inventive principles disclosed herein may be applied to a wide variety of alternative embodiments and implementations, including, for example, deployment of curtain airbag cushions from chambers other than a pillar trim chamber, deployment of non-curtain airbag cushions, and the like.

FIG. 2 also illustrates how release mechanism 120 is configured to separate during deployment such that one or more elements remain coupled to panel 10 and one or more elements remain coupled to mounting surface 15 following separation and deployment of cushion 110. Thus, the elements remaining with mounting surface 15 are shown at 120A and the elements remaining with panel 10 are shown at 120B in FIG. 2.

Figure 3:
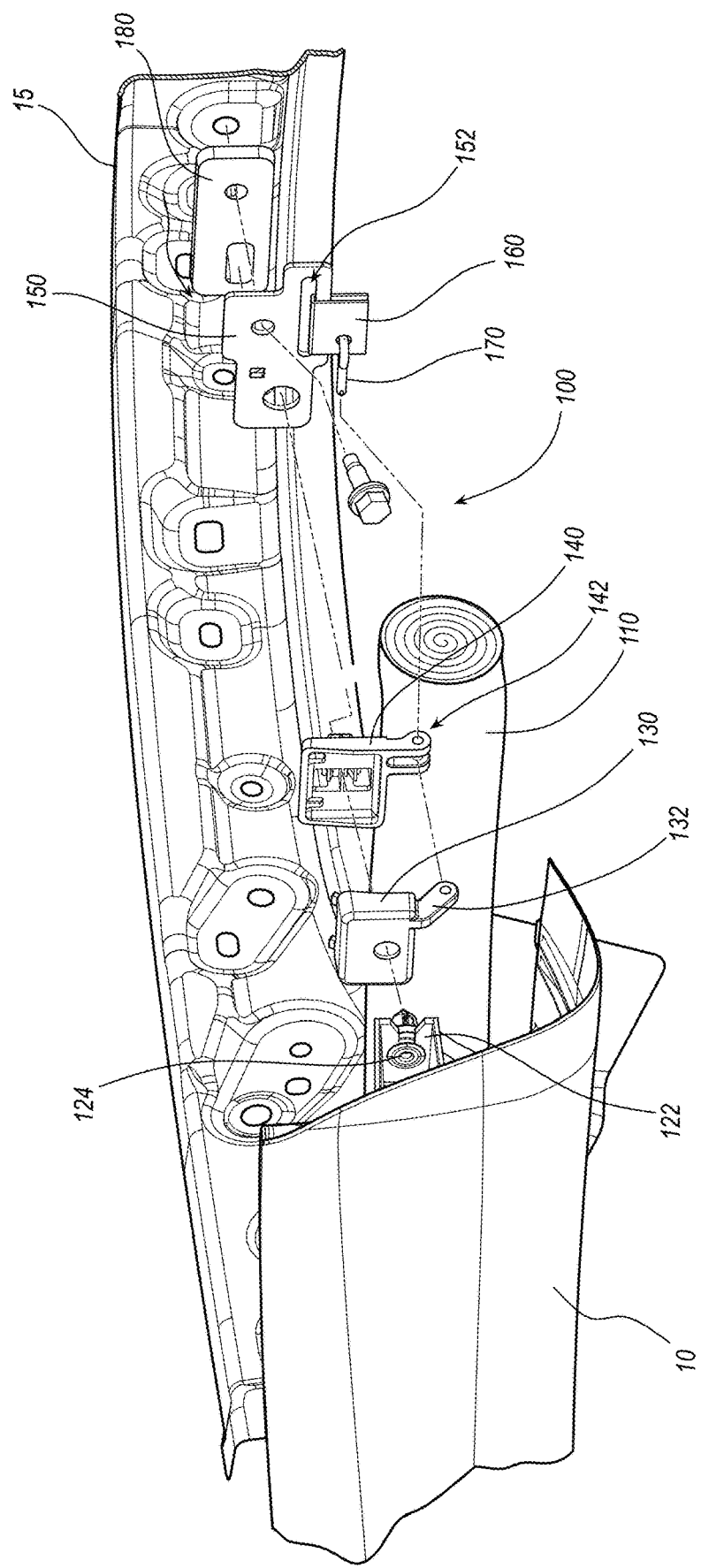
FIG. 3 is an exploded, perspective view of the curtain airbag assembly showing the various components of the release mechanism of the curtain airbag assembly.

FIG. 3 is an exploded view showing in greater detail the various components of release mechanism 120 in certain preferred embodiments. In particular, release mechanism 120 comprises a mounting bracket 122, which may be an integral part of or otherwise coupled with panel 10. A mounting pin 124, which may be an integral part of or otherwise coupled with panel 10, or another suitable fastener may be used to couple one or more other components of release mechanism 120 to mounting bracket 122. Thus, release mechanism 120 further comprises an inboard coupling piece 130 and an outboard coupling piece 140. Outboard coupling piece 140 is releasably coupled with inboard coupling piece 130.

Moreover, as described in greater detail below, outboard coupling piece 140 and inboard coupling piece 130 each comprises a slot or opening for releasably receiving a release pin 170 therethrough, which, when withdrawn from the respective openings of the two coupling pieces, allows the two coupling pieces to separate and thereby allows panel 10 to separate from internal mounting surface 15 of the vehicle, again, using only the initial retraction force that is typically along the axis of cushion 110 and in a direction towards a center or at least central portion of cushion 110. However, using the principles provided herein, those of ordinary skill in the art will appreciate that a wide variety of alternative embodiments are possible that may similarly use this initial retraction force for actuation. For example, in other embodiments, a tether may be used in place of release pin 170. In some such embodiments, the tether may comprise a frangible and/or weakened portion that is configured to sever upon deployment to provide for this releasing function. In still other embodiments, the pin or another suitable release member may itself comprise a frangible and/or weakened portion. Thus, any of the foregoing should be considered examples of means for releasing a panel containing an airbag cushion, curtain or otherwise, therein by use of an initial retraction force, which may be along an axis of the cushion prior to deployment and/or in a direction perpendicular, or at least substantially perpendicular, to the primary direction of deployment of the airbag cushion.

In the depicted embodiment, the aforementioned alignable openings in outboard coupling piece 140 and inboard coupling piece 130 are provided in respective coupling members extending from the respective coupling pieces. Thus, inboard coupling piece 130 comprises a projecting coupling member 132 extending therefrom, which comprises a hole, as previously mentioned. Similarly, outboard coupling piece 140 comprises a projecting coupling member 142 extending therefrom that also comprises a hole that is configured to be aligned with the hole of inboard coupling piece 130 to allow release pin 170 to releasably extend therethrough. In the depicted embodiment, release member 142 comprises two opposing legs each having a respective opening and comprising a space therebetween.

Release mechanism 120 further comprises a release bracket 150 to which is coupled a release tab 160. Release tab 160 is coupled, in turn, to cushion 110 and provides the link between cushion 110 and release mechanism 120 to allow for use of the aforementioned initial retraction force to release panel 10. Release tab 160 may comprise a fabric tab and may therefore be sewn directly to cushion 110 in some embodiments. Release tab 160 may be coupled to release bracket 150 by way of slot 152. Thus, for example, in some embodiments, before sewing or otherwise coupling release tab 160 to cushion 110, release tab 160 may be extended through slot 152.

As also shown in FIG. 3, release tab 160 may comprise a hole for receipt of release pin 170 therethrough. This hole may extend through both layers of fabric in embodiments in which release tab 160 is formed from a fabric or fabric-like material, which may be the same or similar to the material used to form cushion 110 itself. Of course, a wide variety of alternative embodiments and configurations are contemplated, such as coupling release pin 170 or another suitable release member or other component to release tab 160 by way of an adhesive, a fastener, or the like. At the inboard side, in some embodiments, another mounting bracket 180 may be provided if necessary.

Figure 4:
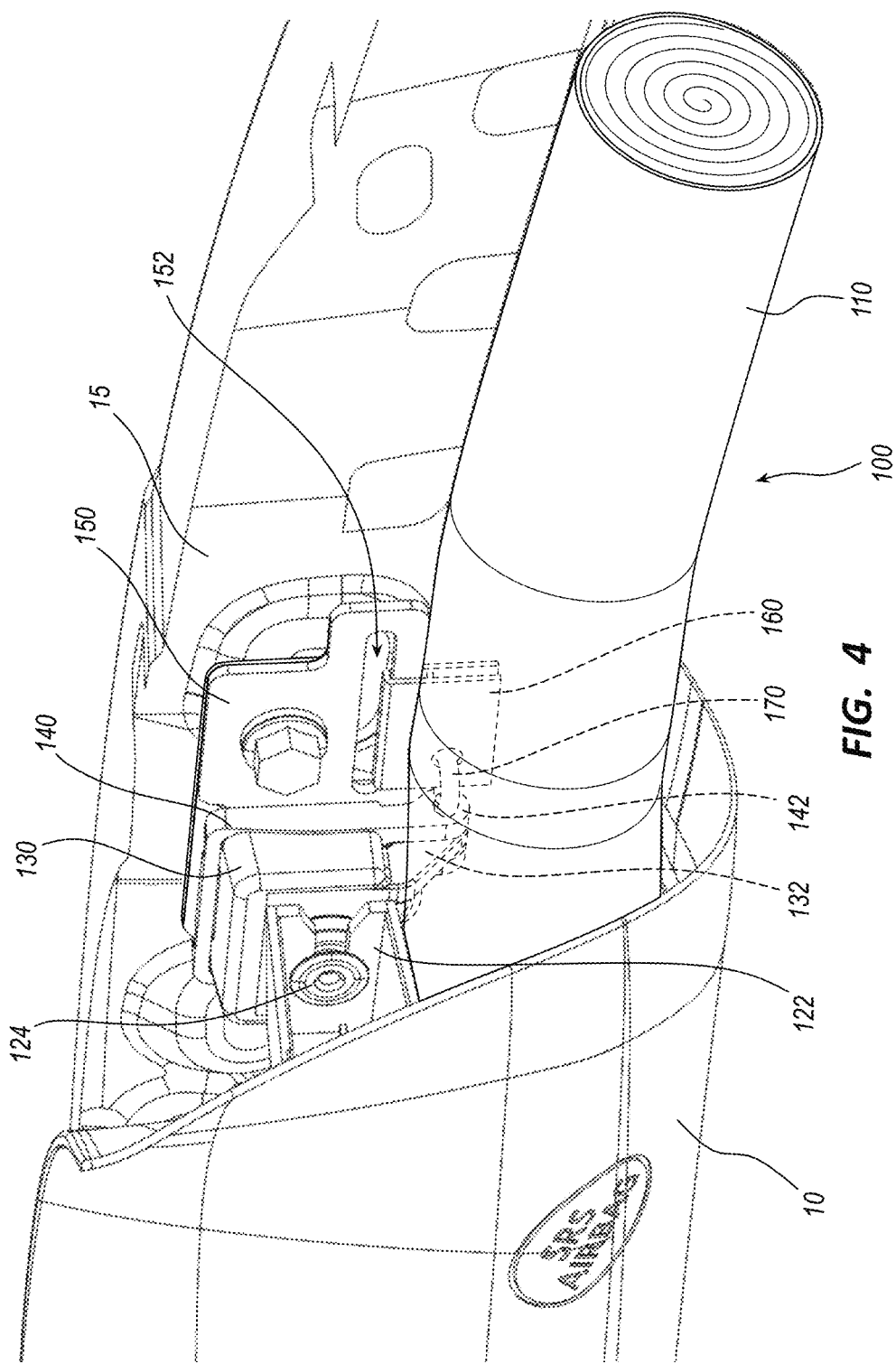
FIG. 4 is a partial breakaway view of the interior of an openable structure containing the curtain airbag assembly.
Figure 5:
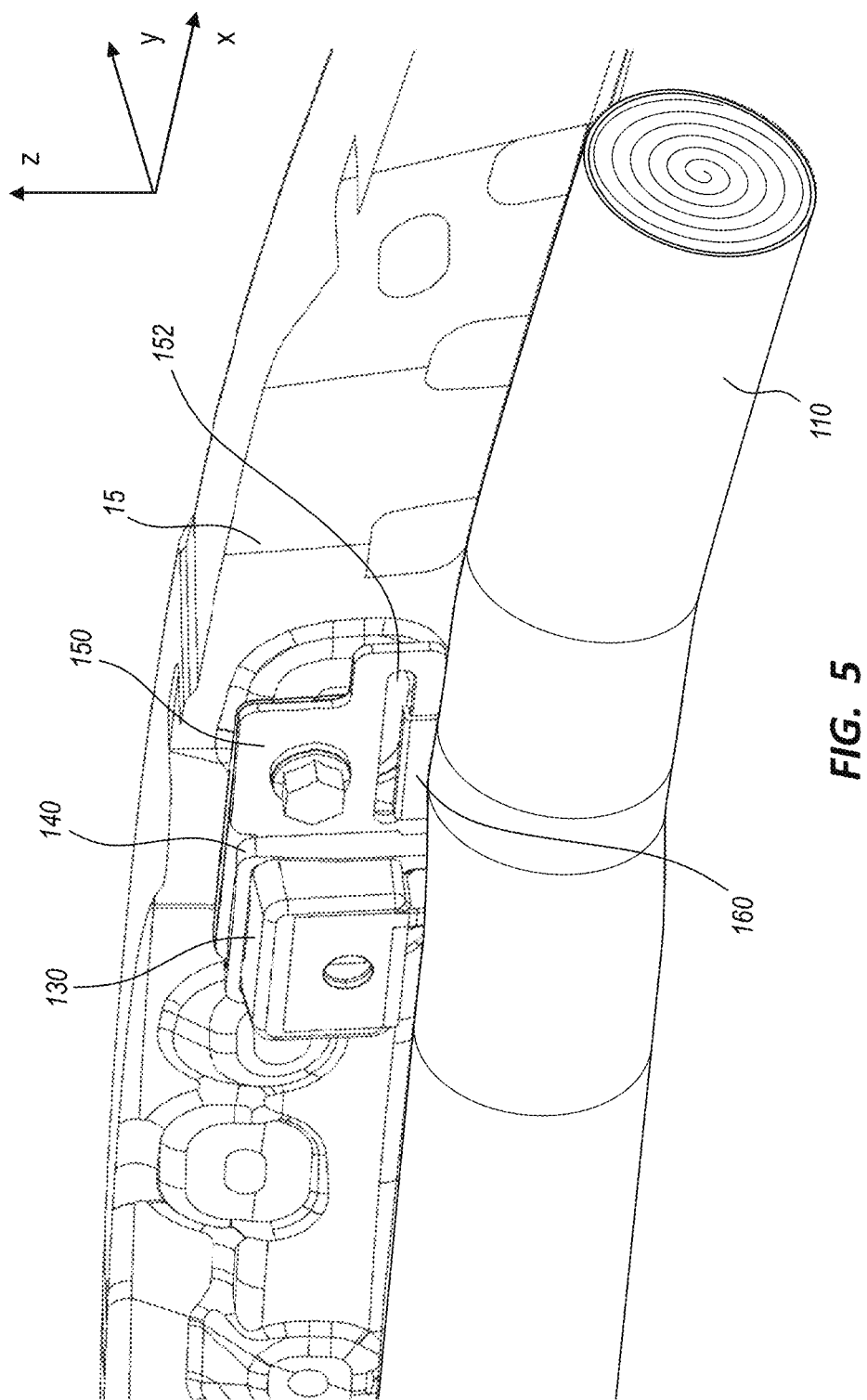
FIG. 5 is a perspective view of the curtain airbag assembly with the adjacent panel removed.

A close-up view of the various components of release mechanism 120 is shown in FIG. 4 in their pre-deployment, and unexploded, configuration and the inboard side of the assembly with panel 10 removed is shown in FIG. 5. As shown in these figures, in the depicted embodiment, slot 152 has a length that is greater than the corresponding length of tab 160 extending therethrough. In this manner, tab 160 may be positioned at or adjacent to one end of slot 152 and may be allowed to slide to the opposite end of slot 152 to slidably release pin 170 and thereby release panel 10 from surface 150 using the initial deployment force previously mentioned. However, it is contemplated that, in alternative embodiments, slot 152 may be the same, or at least substantially the same, length as tab 160. For example, when fabric or another material of suitably flexible material is used, the initial retraction/deployment force may allow this material to compress and/or bunch up without sliding along an elongated slot as is the case with the depicted embodiment.

FIGS. 6A-6C depict additional features of release mechanism 120 not as visible in other figures. For example, as shown in FIGS. 6A and 6B, outboard coupling piece 140 comprises a protruding clip 145 that may be used to clip outboard coupling piece 140 to release bracket 150. Similarly, the opposing legs 142A and 142B of coupling member 142 can also be seen, as well as the space defined therebetween within which coupling member 132 of inboard coupling piece 130 extends.

In addition, as shown in FIG. 6A, release pin 170 comprises a straight portion having a retention knob 173, which may be used to provide a more secure coupling between release pin 170 and one or both of the opposing coupling pieces 130/140 to prevent unintentional release of release pin 170 prior to deployment of airbag cushion 110.

Figure 7B:
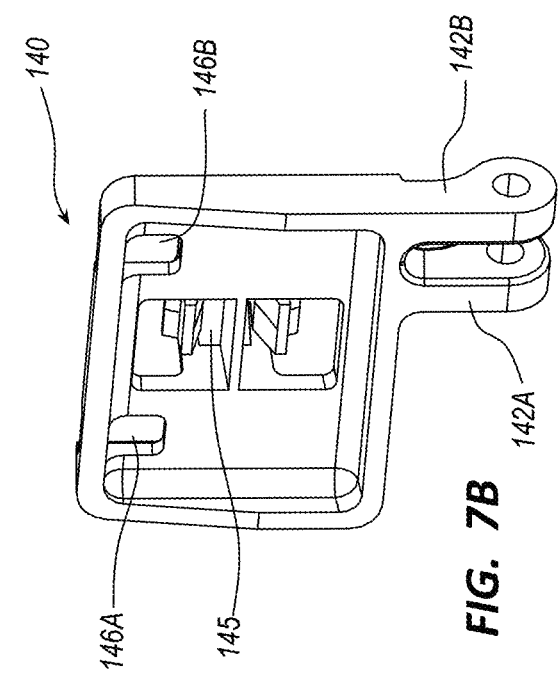
FIG. 7B is a perspective view of an outboard coupling piece of the release mechanism.
Figure 7D:
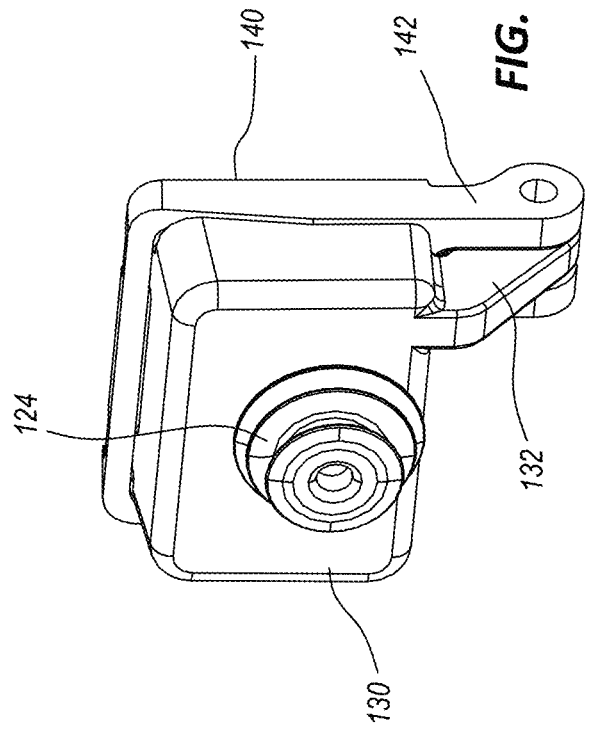
FIGS. 7C and 7D are perspective views of the inboard and outboard coupled together.
Figure 7A:
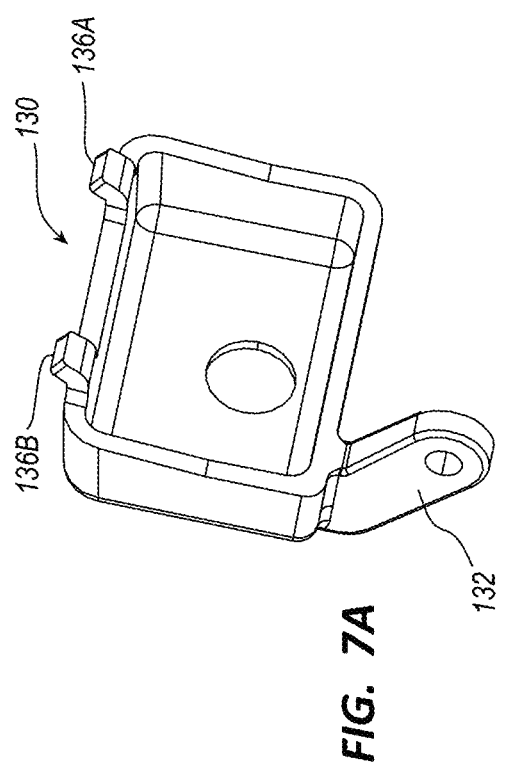
FIG. 7A is a perspective view of an inboard coupling piece of the release mechanism.

Other views of certain components of release mechanism 120 are provided in FIGS. 7A-7D. FIGS. 7A and 7B are perspective views of inboard coupling piece 130 and outboard coupling piece 140, respectively, which better illustrate opposing legs 142A and 142B of outboard coupling member 140 and exemplary features for releasably coupling outboard coupling piece 140 and inboard coupling piece 130. More particularly, a pair of preferably flexible prongs 136A and 136B extend from inboard coupling piece 130 and are configured to be received in respective openings 146A and 146B, respectively, formed within outboard coupling piece 140.

Figure 7C:
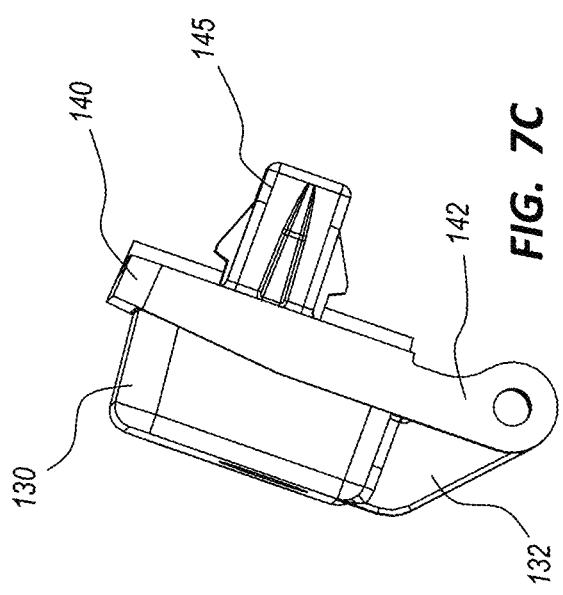

FIGS. 7C and 7D illustrate additional views of the combined inboard and outboard coupling pieces 130 and 140, respectively, along with the way fastener 124 may be used to couple the combined assembly made up of inboard and outboard coupling pieces 130 and 140 to another element, such as mounting bracket 122.

Figure 8:
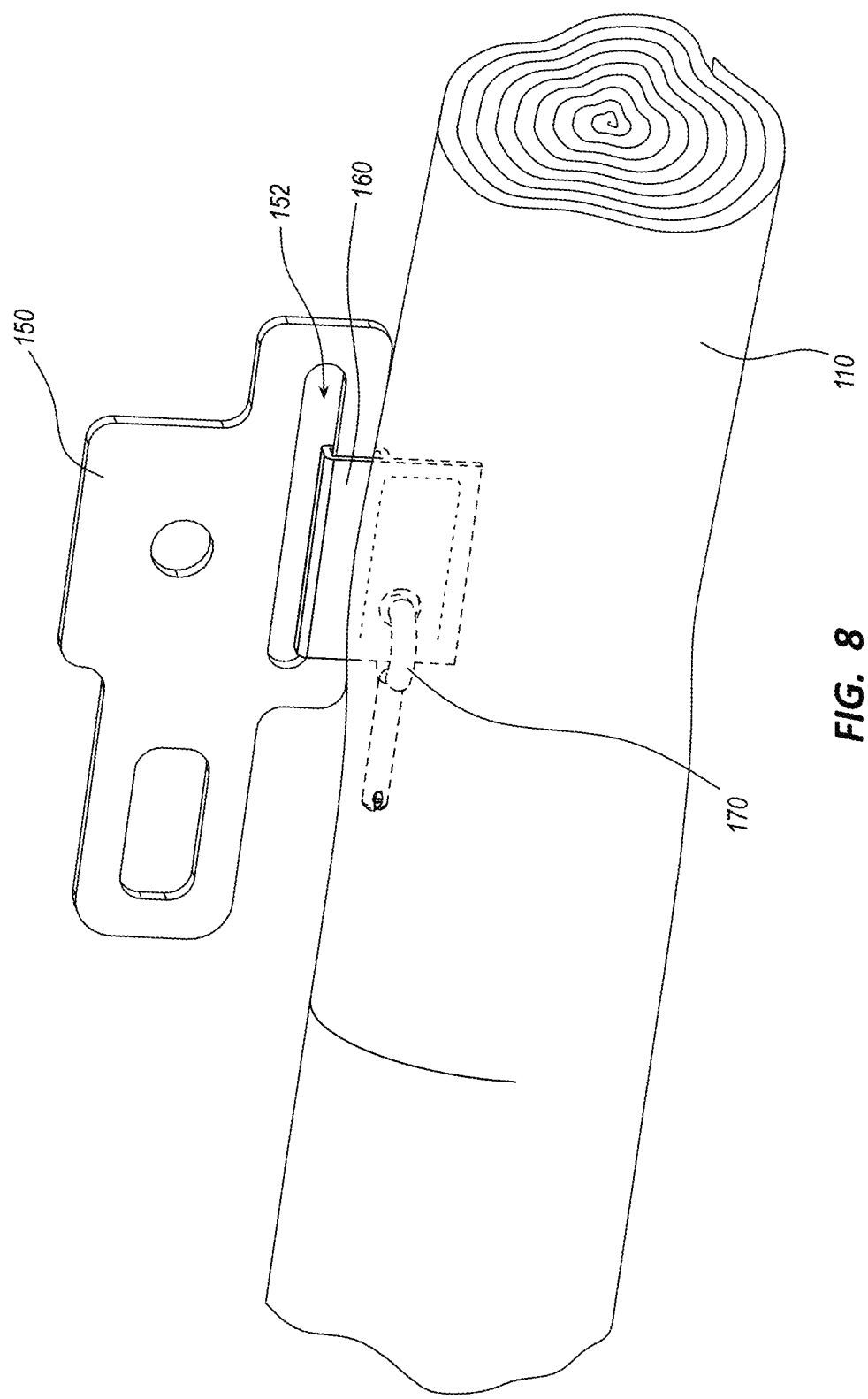
FIG. 8 depicts the components of the release mechanism that use an initial deployment force of a curtain airbag cushion to slide a pin along the axis of the curtain airbag cushion.

FIG. 8 further illustrates how release tab 160 may be allowed to slide along the elongated slot 152 of release bracket 150, which, in turn, results in a sliding withdrawal of release pin 170 from the holes previously mentioned or another suitable means for releasably coupling release pin 170 to a portion of release mechanism 120 that holds two components of the assembly together, the separation of which may allow panel 10 or another suitable openable structure to open upon deployment of the airbag cushion 110. As previously mentioned, the force that allows for this detachment/release is preferably the initial retraction force that may be inward along the axis of the cushion 110 and/or in a direction perpendicular to the primary direction of deployment of the cushion 110.

Figure 9A:
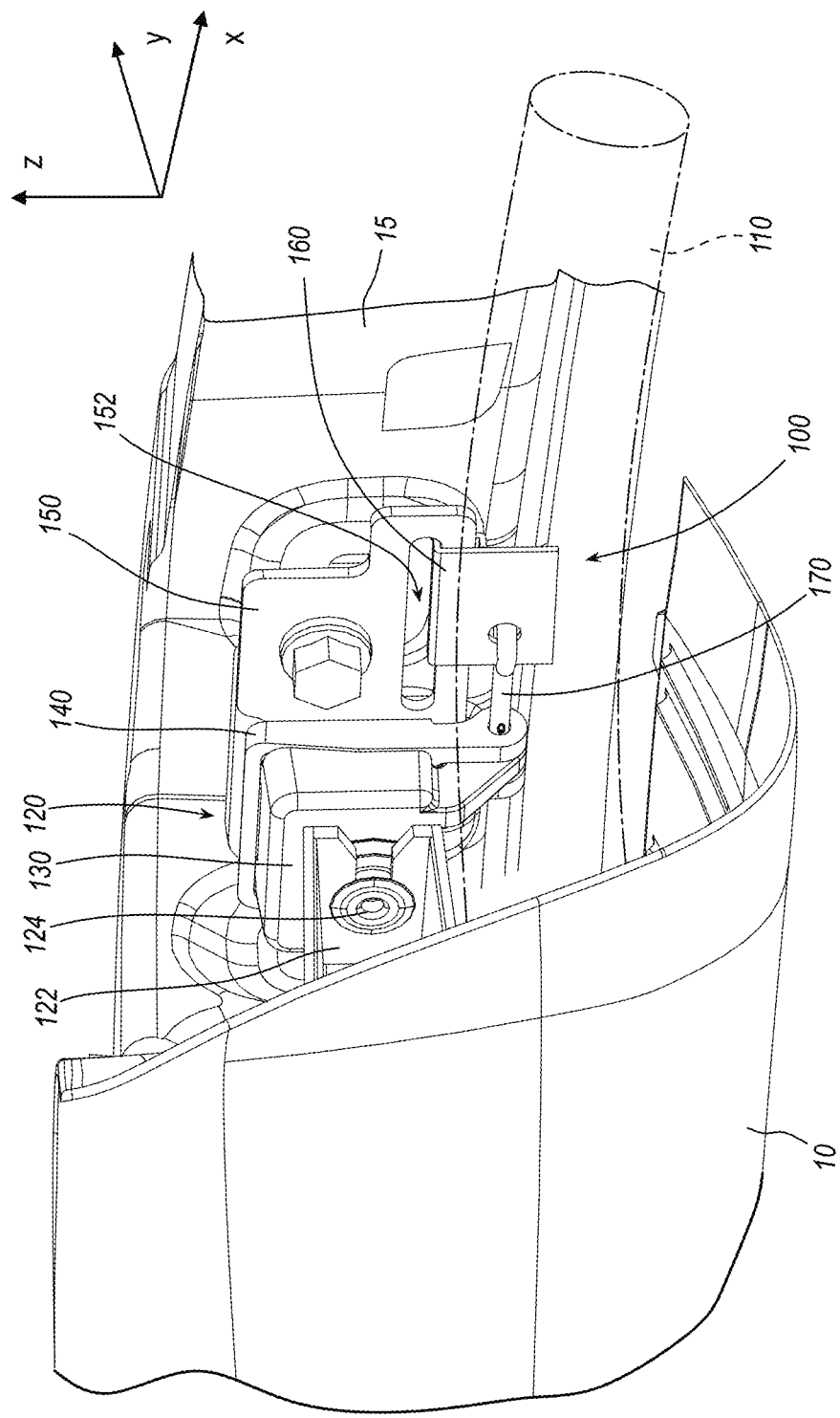
FIGS. 9A and 9B depict the curtain airbag cushion assembly during deployment to illustrate how the release mechanism allows an adjacent panel to be release during deployment.
Figure 9B:
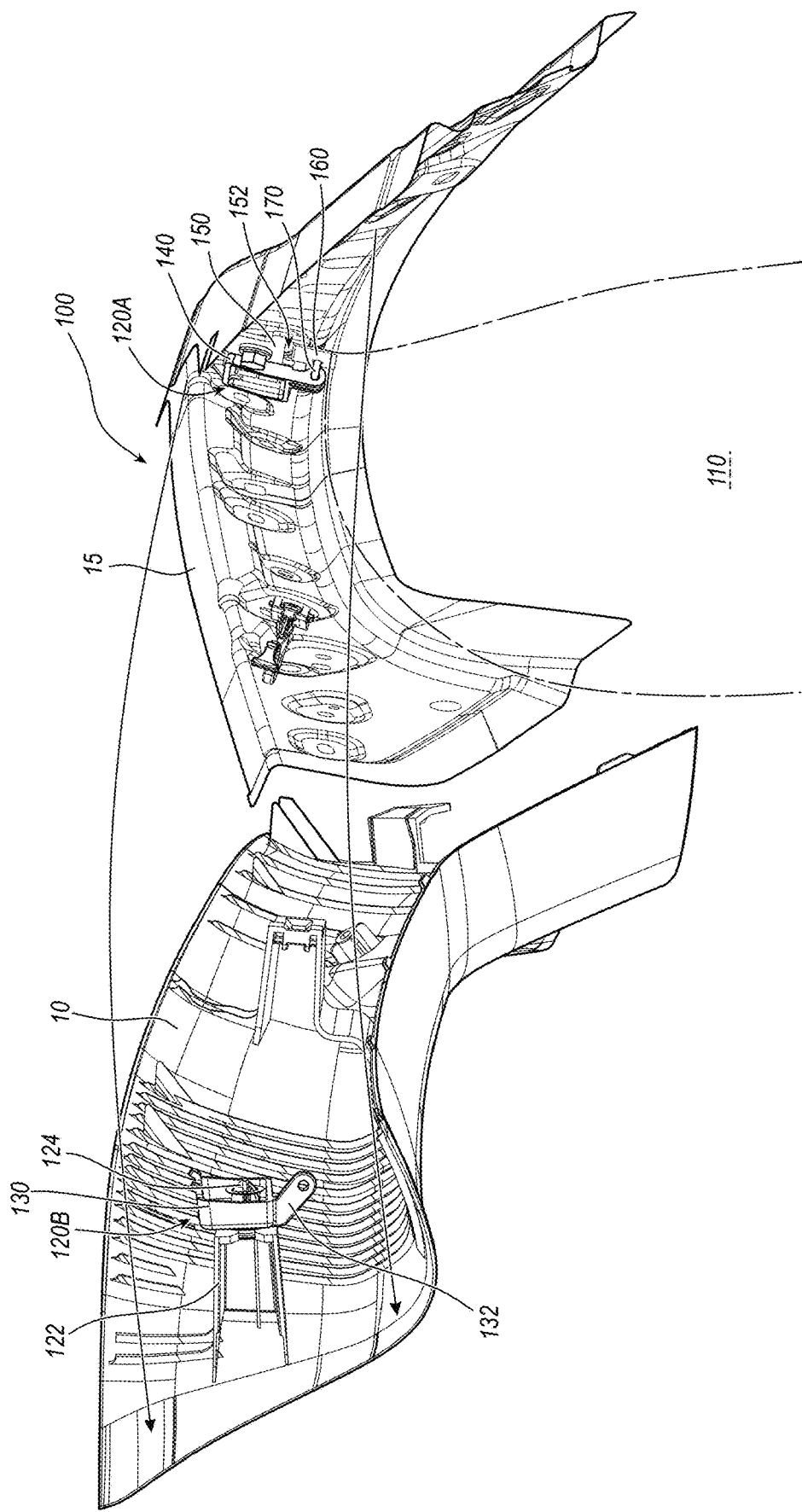

FIGS. 9A and 9B illustrate release mechanism 120 during deployment of airbag cushion 110. As shown in FIG. 9A, at the initial stage of deployment, a retraction force in the x direction causes pin 170 to be withdrawn from the overlapping openings in inboard coupling piece 130 and outboard coupling piece 140. After this has taken place, airbag cushion 110 may deploy primarily in the z (technically negative z) direction and panel 10 may be free to separate from surface 15, as shown in FIG. 9B.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A curtain airbag cushion assembly, comprising:
    an inflator;
    a curtain airbag cushion configured to be inflated with the inflator, the curtain airbag cushion extending along an elongated axis, wherein the curtain airbag assembly is configured to be positioned within and deploy from a panel of a vehicle; and
    a release mechanism coupled with the curtain airbag cushion and configured to be coupled with the panel, wherein the release mechanism is configured to release the panel using an initial deployment force from the curtain airbag cushion, the initial deployment force being in a direction at least substantially parallel to the elongated axis.

2. The curtain airbag cushion assembly of claim 1, wherein the panel comprises a pillar trim panel.

3. The curtain airbag cushion assembly of claim 2, wherein the release mechanism is configured to release the panel prior to deployment of the curtain airbag cushion in a direction at least substantially perpendicular to the elongated axis.

4. The curtain airbag cushion assembly of claim 1, wherein the initial deployment force comprises a retraction force in which the curtain airbag cushion retracts in length between opposing ends of the elongated axis prior to deploying in a direction at least substantially perpendicular to the elongated axis.

5. The curtain airbag cushion assembly of claim 1, wherein the release mechanism comprises a release member configured to slidably release the panel using the initial deployment force.

6. The curtain airbag cushion assembly of claim 5, wherein the release member comprises a release pin coupled with a first coupling piece and a second coupling piece, the release pin being configured to lock the first coupling piece to the second coupling piece in a locked configuration and being configured to release the first coupling piece from the second coupling piece in a released configuration using the initial deployment force.

7. The curtain airbag cushion assembly of claim 6, further comprising a tab coupled to the curtain airbag cushion and to the release pin, wherein the tab is configured to pull the release pin out of an opening formed in the first coupling piece and the second coupling piece to transition from the locked configuration to the released configuration.

8. An airbag cushion assembly, comprising:
   an elongated airbag cushion extending along an elongated axis; and
   a release mechanism configured to release a vehicle structure adjacent to the elongated airbag cushion during deployment, the release mechanism having a locked configuration and a released configuration, wherein in the locked configuration a first element of the release mechanism is secured to a second element of the release mechanism to secure the elongated airbag cushion within the vehicle structure, wherein in the released configuration the first element of the release mechanism can be separated from the second element of the release mechanism to allow the vehicle structure to open and allow the elongated airbag cushion to deploy, wherein the release mechanism is configured to use a direct force from deployment of the elongated airbag cushion to the release mechanism to transition from the locked configuration to the released configuration, and wherein the release mechanism is configured to release the vehicle structure using an initial deployment force from the airbag cushion, the initial deployment force being in a direction at least substantially parallel to the elongated axis.

9. The airbag cushion assembly of claim 8, wherein the elongated airbag cushion comprises a curtain airbag cushion.

10. The airbag cushion assembly of claim 8, wherein the release mechanism is configured to release the panel using only the initial deployment force.

11. The airbag cushion assembly of claim 8, wherein the release mechanism comprises a release member configured to release the vehicle structure.

12. The airbag cushion assembly of claim 11, wherein the first element comprises a first opening, wherein the second element comprises a second opening, and wherein the release member comprises a release pin extending through the first and second openings, the release pin being configured to lock the first element to the second element in the locked configuration and being configured to release the first element from the second element in the released configuration using the force from deployment.

13. A release assembly for releasing a vehicle panel to allow for deployment of an airbag cushion contained with the vehicle panel, the release assembly comprising:
   a first coupling piece configured to be coupled to the vehicle panel;
   a second coupling piece configured to be coupled to a vehicle structure opposite the vehicle panel; and
   a release member coupled with the first coupling piece and the second coupling piece, the release member being configured to lock the first coupling piece to the second coupling piece in a locked configuration and being configured to release the first coupling piece from the second coupling piece using a deployment force from the airbag cushion.

14. The release assembly of claim 13, wherein the airbag cushion comprises a curtain airbag cushion, and wherein the vehicle panel comprises a vehicle trim panel.

15. The release assembly of claim 13, wherein the release assembly is configured to release the vehicle panel using an initial deployment force from the airbag cushion, the initial deployment force being in a direction at least substantially perpendicular to a primary direction of deployment of the airbag cushion.

16. The release assembly of claim 15, wherein the airbag cushion comprises an elongated axis, and wherein the initial deployment force is in a direction at least substantially parallel to the elongated axis.

17. The release assembly of claim 13, wherein the airbag cushion comprises an elongated axis, and wherein the release assembly is configured to release the vehicle panel using an initial deployment force from the airbag cushion, the initial deployment force being in a direction towards a center of the airbag cushion.

18. The release assembly of claim 13, wherein the release member comprises a release pin configured to be received in an opening in the locked configuration and configured to be removed from the opening in a released configuration.

19. The release assembly of claim 18, wherein the opening is defined at least in part by a first coupling member of the first coupling piece and at least in part by a second coupling member of the second coupling piece.

* * * * *